United States Patent
Tiwari et al.

(10) Patent No.: US 11,409,710 B2
(45) Date of Patent: Aug. 9, 2022

(54) LIGHTWEIGHT ANALYTICS SERVER TO HANDLE HETEROGENEOUS DOCUMENT TYPES

(71) Applicant: SAP SE, Walldorf (DE)

(72) Inventors: Rahul Tiwari, Allahabad (IN); Nikita Jain, Bangalore (IN); Upendra Dandwate, Pune (IN)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 16/876,389

(22) Filed: May 18, 2020

(65) Prior Publication Data

US 2021/0357368 A1    Nov. 18, 2021

(51) Int. Cl.
| | |
|---|---|
| *G06F 16/18* | (2019.01) |
| *G06F 16/182* | (2019.01) |
| *G06F 9/48* | (2006.01) |
| *G06F 16/93* | (2019.01) |
| *H04L 67/56* | (2022.01) |

(52) U.S. Cl.
CPC .......... *G06F 16/182* (2019.01); *G06F 9/4856* (2013.01); *G06F 16/93* (2019.01); *H04L 67/56* (2022.05)

(58) Field of Classification Search
CPC ...... G06F 16/182; G06F 16/93; G06F 9/4856; H04L 67/28; H04L 67/22; H04L 67/56
See application file for complete search history.

(56) References Cited

U.S. PATENT DOCUMENTS

| | | | | |
|---|---|---|---|---|
| 9,916,135 | B2* | 3/2018 | Dube | G06F 8/70 |
| 10,142,353 | B2* | 11/2018 | Yadav | H04L 63/0227 |
| 10,430,510 | B2* | 10/2019 | Evers | G06F 40/174 |
| 2006/0190544 | A1* | 8/2006 | Chikirivao | G06Q 30/04 |
| | | | | 709/206 |
| 2015/0161117 | A1* | 6/2015 | Bhagwat | G06F 40/258 |
| | | | | 707/771 |
| 2016/0253512 | A1* | 9/2016 | Evers | G06F 21/6209 |
| | | | | 726/6 |
| 2017/0039527 | A1* | 2/2017 | Rangan | G06Q 10/1095 |
| 2018/0349254 | A1* | 12/2018 | Hui | G06F 11/3664 |
| 2019/0057088 | A1* | 2/2019 | Chander | G06F 16/953 |
| 2019/0087176 | A1* | 3/2019 | Krishnappa | G06F 8/658 |
| 2019/0188247 | A1* | 6/2019 | Weinreb | G06F 16/14 |
| 2021/0097061 | A1* | 4/2021 | Amihod | G06F 16/2322 |

\* cited by examiner

*Primary Examiner* — Merilyn P Nguyen
(74) *Attorney, Agent, or Firm* — Fish & Richardson P.C.

(57) ABSTRACT

Methods, systems, and computer-readable storage media for receiving, by a web tier, an analytics request from a client device, determining, by the web tier, that the analytics request implicates at least one offline document, transmitting, by the web tier, at least a portion of the analytics request to a slim analytics server of an analytics platform, the slim analytics server operating in an offline mode and, in response to receiving the at least a portion of the analytics request, the slim analytics server communicates with an offline document server that loads data from the at least one offline document and executes one or more computations on the data to provide analytics results to the slim analytics server, receiving, by the web tier, the first analytics results from the first slim analytics server, and transmitting, by the web tier, a response to the client device, the response including the analytics results.

17 Claims, 4 Drawing Sheets

LIGHTWEIGHT ANALYTICS SERVER TO HANDLE HETEROGENEOUS DOCUMENT TYPES

BACKGROUND

Analytics platforms enable enterprises to process data through analytics functionality to provide analytics results, which provide insight into operations of the enterprise. In some examples, an analytics platform includes an analytics server that receives data from one or more data sources, which data is processed through analytics functionality to provide the analytics results. Data sources can include online data sources and offline data sources, which maintain online documents and offline documents, respectively.

To enable processing of offline documents, an analytics platform can include an offline document processing engine. In some examples, the offline document processing engine is bundled within an analytics server as an in-memory database running in-process (i.e., within the same process as the analytics server (in-proc)). In contrast to offline documents, such a document processing engine is not required for online documents, because computations can be executed directly in the respective online data sources.

In processing data stored in an offline document, the analytics platform accesses the offline document (e.g., using a file name and location provided to the analytics platform), and loads the data stored in the offline document into the offline document processing engine. More particularly, each offline document is loaded into the offline document processing engine as one or more database tables. If the size of the offline document is relatively large and/or several offline documents are loaded to the offline document processing engine at the same time, a significant amount of memory can be occupied within the offline document processing engine. This consumes both memory and central processing unit (CPU) usage in a computing device where the analytics server is installed.

Further, the offline document processing engine has a memory threshold. Once the memory threshold is reached, the offline document processing engine starts pagination to selectively free-up memory. In some examples, pagination includes temporarily removing data from in-memory storage to disk-based storage. The offline document processing engine loads the data back-and-forth between in-memory storage and disk-based storage as the data is needed. This results in significant latency as data is selectively accessed between the different memories.

SUMMARY

Implementations of the present disclosure are directed to an analytics platform that leverages a lightweight analytics server for processing of heterogeneous documents. More particularly, implementations of the present disclosure are directed to an analytics platform that includes a slim analytics server that is absent an offline document processing engine. In an online mode, the slim analytics server handles analytics processing for online documents. In an offline mode, the slim analytics server operates with an offline document server to handle analytics processing for offline documents.

In some implementations, actions include receiving, by a web tier, a first analytics request from a client device, determining, by the web tier, that the first analytics request implicates at least one offline document, transmitting, by the web tier, at least a portion of the first analytics request to a first slim analytics server of an analytics platform, the first slim analytics server operating in an offline mode and, in response to receiving the at least a portion of the first analytics request, the first slim analytics server communicates with an offline document server that loads data from the at least one offline document and executes one or more computations on the data to provide first analytics results to the first slim analytics server, receiving, by the web tier, the first analytics results from the first slim analytics server, and transmitting, by the web tier, a response to the client device, the response including the first analytics results. Other implementations of this aspect include corresponding systems, apparatus, and computer programs, configured to perform the actions of the methods, encoded on computer storage devices.

These and other implementations can each optionally include one or more of the following features: the first slim analytics server is absent functionality for processing offline documents to generate analytics results; the first slim analytics server executes within a first process and the offline document server executes in a second process that is different from the first process; actions further include determining, by the web tier, that a second analytics request implicates at least one online document, transmitting, by the web tier, at least a portion of the second analytics request to a second slim analytics server of the analytics platform, the second slim analytics server operating in an online mode and, in response to receiving the at least a portion of the second analytics request, the second slim analytics server communicates with at least one online data sources that executes one or more computations on data of the at least one online document to provide second analytics results to the second slim analytics server, and receiving, by the web tier, the second analytics results from the first slim analytics server; the first slim analytics server includes a proxy for communication with the offline document server; the analytics platform includes a normal analytics server and an offline document processing engine that execute in a process; and the response includes a server identifier that uniquely identifies the first slim analytics server within the analytics platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to an analytics platform that leverages a lightweight analytics server for processing of heterogeneous documents. More particularly, implementations of the present disclosure are directed to an analytics platform that includes a slim analytics server that is absent an offline document processing engine. In an online mode, the slim analytics server handles analytics processing for online documents. In an offline mode, the slim analytics server operates with an offline document server to handle analytics processing for offline documents.

Implementations can include actions of receiving, by a web tier, an analytics request from a client device, determining, by the web tier, that the analytics request implicates at least one offline document, transmitting, by the web tier, at least a portion of the analytics request to a slim analytics server of an analytics platform, the slim analytics server operating in an offline mode and, in response to receiving the at least a portion of the analytics request, the slim analytics server communicates with an offline document server that loads data from the at least one offline document and executes one or more computations on the data to provide analytics results to the slim analytics server, receiving, by the web tier, the first analytics results from the first slim analytics server, and transmitting, by the web tier, a response to the client device, the response including the analytics results.

Implementations of the present disclosure are described in further detail herein with reference to an example analytics platform. The example analytics platform includes SAP Lumira provided by SAP SE of Walldorf, Germany. SAP Lumira can be described as an in-memory analytics platform that stores and processes data in-memory. The term in-memory refers to storing data in main memory, such as random access memory (RAM), that communicates with one or more processors (e.g., central processing units (CPUs)) over a memory bus. It is contemplated, however, that implementations of the present disclosure can be realized with any appropriate analytics platform.

To provide further context for implementations of the present disclosure, and as introduced above, analytics platforms enable enterprises to process data through analytics functionality to provide analytics results, which provide insight into operations of the enterprise. In a non-limiting example context, analytics results can include statistics regarding sales, margins, profits and the like across one or more localities (e.g., statistics related to sales of a particular item in respective cities). In some examples, an analytics platform includes an analytics server that receives data from one or more data sources. The analytics server processes the data through analytics functionality to provide the analytics results. An example analytics system includes, without limitation, SAP Lumira, introduced above.

Data sources can include online data sources and offline data sources, which is maintained inside online documents and offline documents, respectively. In some examples, an online data source is directly connected with the database, such that the analytics platform has direct access to online datasources thru online documents stored therein. Example online data sources can include, without limitation, a database system (e.g., SAP HANA provided by SAP SE), and a data warehousing system (e.g., SAP Business Warehouse (BW) provided by SAP SE). In some examples, online data sources can be considered so-called live data sources, where computations can be executed on data stored in the online documents within the respective online data sources. For example, at least a portion of calculations for analytics processing can be executed within the online data sources.

In some examples, an offline data source is a data source that is not directly connected with the database. For example, an offline document stores one or more offline datasources, each offline document being provided as a computer-readable file. Example offline data sources can include. Example offline documents can include, without limitation, spreadsheet documents (e.g., stored in .csv, .xls, etc.) and databases. For example, an offline document can be maintained on a server of an enterprise and can be identified to the analytics platform for analytics processing (e.g., a file name and location are provided to the analytics platform, which loads the offline document).

In some examples, an analytics platform provides an offline document processing engine to provide analytics functionality for offline documents. As a non-limiting example, SAP Lumira provides the so-named velocity engine to handle offline documents. In some examples, the offline document processing engine (e.g., velocity engine) is bundled within an analytics server (e.g., Lumira Server) as an in-memory database running in-process (i.e., within the same process as the analytics server (in-proc)). In contrast to offline documents, such a document processing engine is not required for online documents, because computations can be executed directly in the respective online data sources.

In processing data stored in an offline document, the analytics platform accesses the offline document (e.g., using a file name and location provided to the analytics platform), and loads the data stored in the offline document into the offline document processing engine (e.g., velocity engine). More particularly, each offline document is loaded into the offline document processing engine as one or more database tables. If the size of the offline document is relatively large and/or several offline documents are loaded to the offline document processing engine at the same time, a significant amount of memory can be occupied within the offline document processing engine. This consumes memory and CPU usage in a computing device where the analytics server (e.g., Lumira Server) is installed.

In some examples, the offline document processing engine has a memory threshold. Once the memory threshold is reached, the offline document processing engine starts pagination to selectively free-up memory. In some examples, pagination includes temporarily removing data from in-memory storage to disk-based storage. The offline document processing engine loads the data back-and-forth between in-memory storage and disk-based storage as the data is needed. This results in significant latency as data is selectively accessed between the different memories.

As noted above, each analytics server is bundled with the offline document processing engine as an in-proc database (i.e., in the same process as the analytics server). Accordingly, the analytics server has to start this in-memory database (i.e., the offline document processing engine) when the analytics server itself is started. This delays start/stop/restart of the analytics server. Further, and as also noted above, when many offline documents are opened, memory is consumed for loading and computation of corresponding tables. As a result, online document requests can stall due to excessive computation and/or usage of memory. Further, if the offline document processing engine becomes corrupted, the entire analytics server needs to be repaired or cloned. This stops the entire functionality of the analytics server including processing of online documents, which do not have any dependency on the offline document processing engine. It can also be noted that, while a majority of use cases might only process online documents, issues can anyway arise when an analytics server installation or upgrade has upgrades to the offline document processing engine. While such upgrade is unnecessary for online connections, it anyway impacts the online connections. For example, connections to online data sources can be interrupted during upgrade of the offline document processing engine.

In view of the above context, implementations of the present disclosure provide an analytics platform that includes a lightweight analytics server, referred to herein as a slim analytics server, and an offline documents server. Further, the analytics platform can include a traditional analytics server, referred to herein as a normal analytics server, which includes an offline document processing engine bundled in-proc (e.g., Lumira Server with velocity engine). That is, the normal analytics server operates with an offline document processing engine executing in the same process and includes functionality (e.g., provided through one or more plug-ins) that enable the normal analytics server to handle the offline documents with the offline document processing engine. Implementations of the present disclosure enable the analytics platform to be configured based on respective needs (e.g., processing of online documents only, processing of online documents and offline documents).

In some implementations, a first configuration includes a slim analytics server that handles online documents only. That is, the slim analytics server is absent any offline document processing engine (e.g., velocity engine). Further, the slim analytics server is absent any functionality (e.g., provided by one or more plug-ins) that would be otherwise needed to process offline documents. In the first configuration, the slim analytics server operates in an online mode (i.e., processing of online documents only). In some implementations, a second configuration includes a slim analytics server and an offline documents server to handle offline documents. The offline document server includes offline document processing and handles requests based on offline documents. For example, the offline document server includes functionality (e.g., provided by one or more plug-ins) that is needed to process offline documents. In the second configuration, the slim analytics server operates in an offline mode (i.e., processing of only documents only and transmitted requests to the offline document server to handle requests for offline documents). In some implementations, a third configuration includes a normal analytics server (i.e., analytics server with in-proc offline document processing engine) and one or both of a slim analytics server operating in an online mode and a slim analytics server operating in an offline mode with an offline document server.

Figure 1:
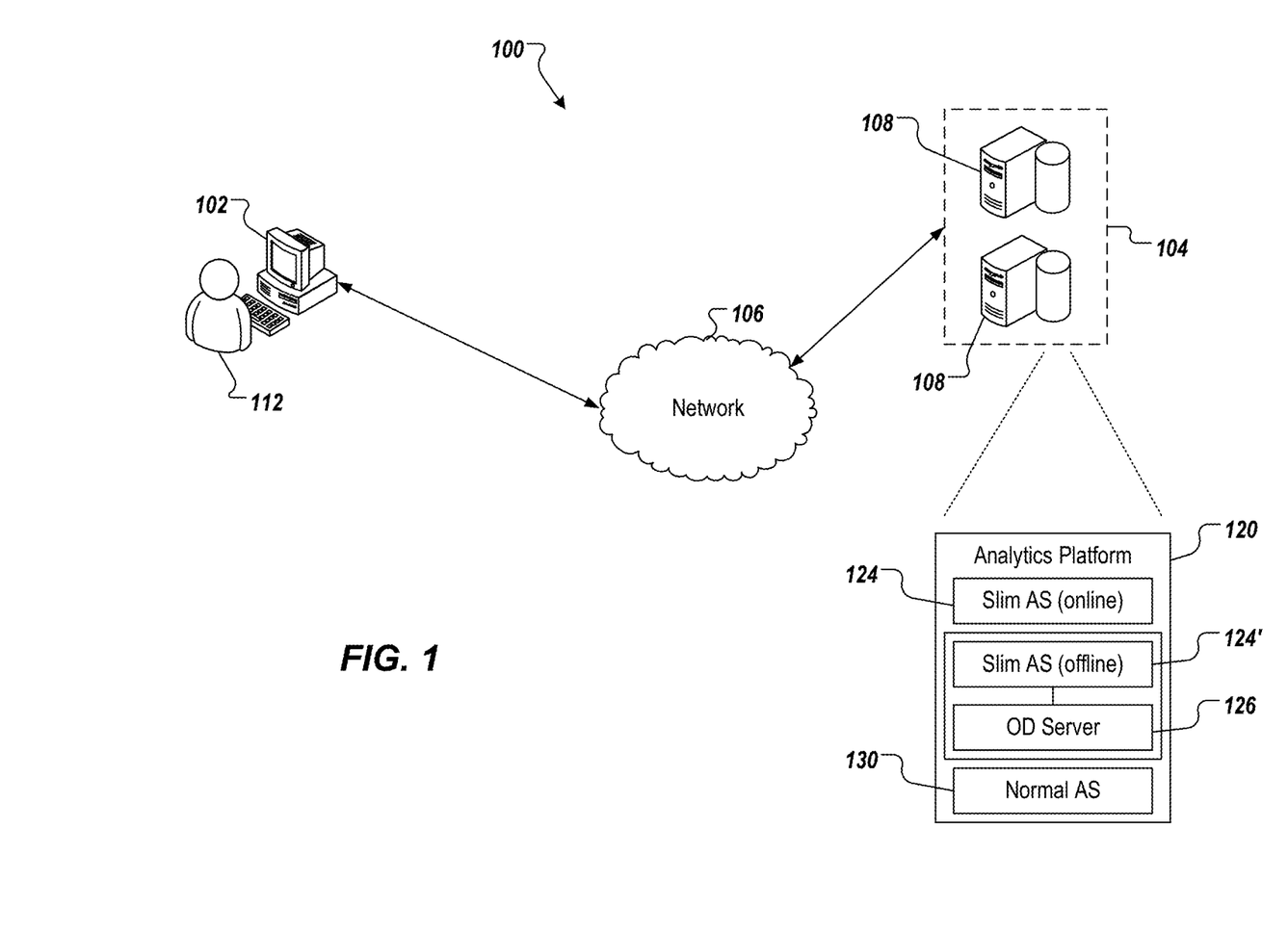
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host an analytics platform 120 in accordance with implementations of the present disclosure. More particularly, the server system 104 can host the analytics platform 120, which can include a slim analytics server (online) 124 (i.e., operating in the online mode) that is absent an offline document processing engine. When operating in the online mode, the slim analytics server 124 only processes requests associated with online documents. The analytics platform 120 also includes a slim analytics server (offline) 124' (i.e., operating in the offline mode) that is absent an offline document processing engine. When operating in the offline mode, the slim analytics server (offline) 124' communicates with an offline document server 126, which handles requests associated with offline documents, the requests being routed by the slim analytics server (offline) 124' to the offline document server 126. In some examples, the analytics platform 120 can include a normal analytics server 130 (i.e., an analytics server with in-proc offline document processing (ODP) engine).

Although both a slim analytics server (online) 124 and a slim analytics server (offline) 124' are depicted in the example of FIG. 1, it is contemplated that the analytics platform 120 can be configured to include one or the other. For example, in a first configuration the analytics platform 120 includes only the slim analytics server (online) 124 (or multiple instances of the slim analytics server (online) 124), and in a second configuration the analytics platform 120 includes only the slim analytics server (offline) 124' (i.e., the slim analytics server (offline) 124' and the offline document server 126). Further, although a normal analytics server 130 is depicted in FIG. 1, it is contemplated that the analytics platform 120 can be absent a normal analytics server.

In some examples, the analytics platform 120 is provided as a cloud-based platform. The client device 102 can communicate with the analytics platform through a web tier, described in further detail herein. The web tier can include one or more web application servers that host web applications, the web applications facilitating communication (e.g., over hypertext transfer protocol (HTTP)) between the client device 102 and the analytics platform 120. For example, the client device 102 can execute a browser application that enables the user 112 to provide input to and receive output (e.g., analytics results) from the analytics platform 120.

As introduced above, implementations of the present disclosure provide an analytics platform that includes a lightweight analytics server, referred to herein as a slim analytics server, and an offline documents server. Further, implementations of the present disclosure enable the analytics platform to be configured based on respective needs (e.g., processing of online documents only, processing of online documents only, and processing of both online and offline documents). In some implementations, a first configuration includes a slim analytics server that handles online documents only. That is, the slim analytics server is absent any offline document processing engine (e.g., velocity engine). In the first configuration, the slim analytics server operates in an online mode (i.e., processing of online documents only). In some implementations, a second configuration includes a slim analytics server and an offline documents server to handle offline documents. The offline document server includes offline document processing and handles requests based on offline documents. In the second configuration, the slim analytics server operates in an offline mode (i.e., processing of only offline documents using the offline document server). In some implementations, a third configuration includes a normal analytics server (i.e., analytics server with in-proc offline document processing engine) and one or both of a slim analytics server operating in an online mode and a slim analytics server operating in an offline mode with an offline document server.

In accordance with implementations of the present disclosure, and as noted above, the analytics platform can be configured. For example, one or more user interfaces (UIs) can be displayed on a computing device, which include configuration options for the analytics platform. In some examples, a UI can be displayed during configuration of the analytics platform and can display a set of features that can be selected for installation with the analytics platform. Example features can include, without limitation, applications, services, and servers. For example, an example UI can display a list of features with respective user-selectable icons (e.g., tick boxes) that enable a user to select one or more features for installation with the analytics platform. Table 1, below, provides an example set of features in accordance with implementations of the present disclosure:

TABLE 1

Example Selectable Features for Analytics Platform

| Feature |
| --- |
| Normal Analytics Server |
| Web Applications |
| RESTful Web Services |
| Schedule Service |
| Mobile Web Applications |
| Slim Analytics Server |
| Offline Document Server |

In some implementations, the slim analytics server (offline mode) and the offline document server execute in separate processes. For example, each of the slim analytics server and the offline document server execute in respective processes that are separate from one another. In this manner, each of the slim analytics server and the offline document server can execute on the same computing device (hardware), but in respective processes. In some examples, a process can be described as a program in execution. For example, a Lumira server is a Java process, which spawns a velocity engine thread (e.g., a C++ program). The velocity engine runs as a thread within the Lumira Java process.

In some implementations, if a slim analytics server is selected, a mode of the slim analytics server is configured by setting a parameter value for a mode parameter. Example parameter values include online and offline. In some examples, a default parameter value is initially provided. For example, online can be provided as the default parameter value. As another example, offline can be provided as the default parameter value. In some examples, a UI can be provided that enables the parameter value for a mode parameter to be set. For example, the slim analytics server can be selected within a UI (e.g., clicking on a graphical representation of the slim analytics server within the UI) and a configuration UI for the slim analytics server can be displayed in response. The configuration UI displays parameters and respective parameters values for the slim analytics server. The UI enables parameter values to be adjusted. For example, a parameter can be selected (e.g., clicking on a graphical representation of the parameter value within the configuration UI), in response, two or more selectable parameter values can be displayed (e.g., offline, online), and a parameter value can be selected.

Accordingly, the analytics platform of the present disclosure can be configured to have various configurations of servers. Table 2, below, provides a summary of servers of the present disclosure and respective capabilities with respect to processing of data from online documents and offline documents:

TABLE 2

Server and Capability Summary

| Server Installation | Document supported | |
| --- | --- | --- |
| | Online Document | Offline Document |
| SAS (online) | Yes | No |
| SAS (offline) + OD Server | No | Yes |
| Normal Analytics Server | Yes | Yes |

In accordance with implementations of the present disclosure, if, for a particular enterprise, the analytics platform is only to process data from online documents, only the slim analytics server is instantiated and is set to the online mode. If, for a particular enterprise, the analytics platform is to process data from offline documents, the slim analytics server is instantiated and is set to the offline mode, the and offline documents server are instantiated. In some examples, a normal analytics server can be instantiated for processing of both online documents and offline documents.

Figure 2:
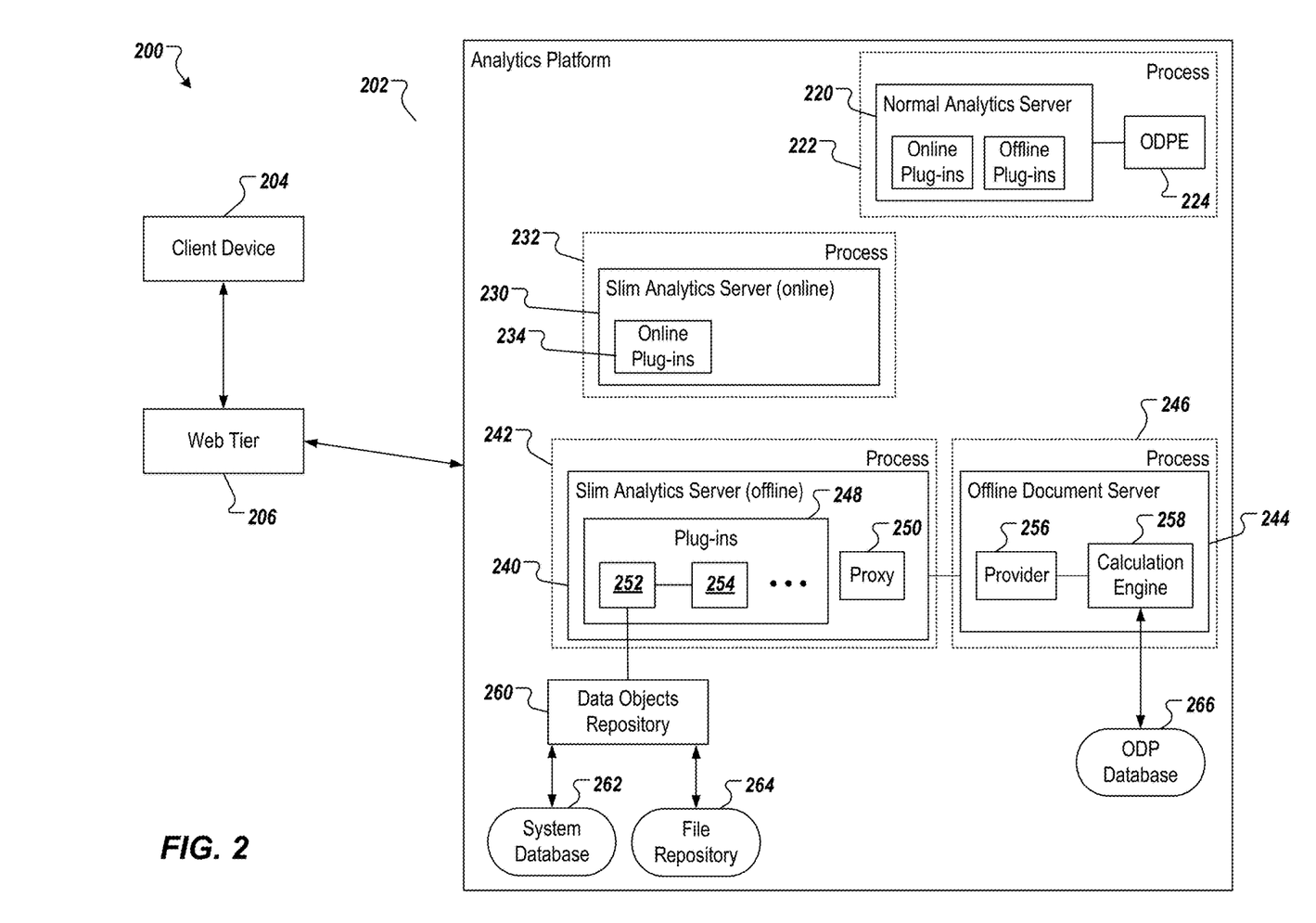
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an analytics platform 202, a client device 204, and a web tier 206. In some examples, the analytics platform 202 is provided as a cloud-based platform that is accessed through the web tier 206. In some examples, the web tier 206 can include one or more web applications executed on one or more web application servers (e.g., an Apache Tomcat® server). In some examples, the client device 204 executes a browser application that enable interaction with the one or more web applications of the web tier 206.

In some examples, and as described herein, the web tier 206 receives requests for analytics processing from the client device 204 and routes the requests to respective servers within the analytics platform 202. For example, the client device 204 can transmit a request for particular analytics to be provided (e.g., statistics related to sales of a particular item in respective cities). For example, each request can indicate one or more documents that are to be accessed for the analytics processing, the one or more documents including one or both of online documents and offline documents. In some examples, for each request, the web tier 206 determines the type(s) of document(s) to be accessed (e.g., online document(s), offline document(s)) and routes the request to an appropriate server within the analytics platform 202.

An example request payload is provided as follows:
defaultView: true
cafWebSesInit: true
bttoken: MDAwRDgBSZ1Y7RFU5NWRfPDQ3Rztp OmE3VUxGaz9eMzAEQ
opendocTarget: infoviewOpenDocFrame
appKind: InfoView
service: %2FInfoView %2Fcommon %2FappService.do
loc: en
pvl: en_US
ctx: standalone
actId: 6050
cuid: MwaTb3oAB4vOADABdAAAP0gBAgpCgPoAAAA
doc_type: online
objIds: 6298
containerId: 6122
pref: maxOpageUt %3D200%3BmaxOpageC %3D10%3Btz %3DEurope %2FBerlin %3BmUnit %3Dinch %3BshowFilters %3Dtrue %3BsmtpFrom %3Dtrue %3BpromptForUnsavedData %3Dtrue %3B
tidtime: 6050-6298-1588510706627
server_mode: online Example Request Payload The example request includes a CUID which is a unique identifier of a document stored in a file repository server (FRS) inside the CMS. The CMS refers to a path to open a document (e.g., frs://Input/a_154/024/000/6298/BestRun Retail 2.0-Dashboard-guid[b61c31b8-1acb-4ad1-8863-a2b843a451e81].lumx). The DOC_TYPE is used to determine whether the document is online or offline. The SERVER_MODE indicates which slim server is available (if any). In some examples, UI-side code downloaded to open the document will be common, whereas the SERVER_MODE will be used to pick appropriate server to cater calculation. In case of online server mode, the view and table created at the database server will be used while executing queries. In the case of velocity engine/offline server, the document will be unzipped to download the content in velocity engine in-memory side on top of which calculation queries will be executed.

In the example of FIG. 2, the analytics platform 202 includes a normal analytics server 220 that executes within a process 222. The normal analytics server 220 includes an ODP engine 224 also executing in the process 222. Accordingly, the normal analytics server 220 can handle both online documents and offline documents. An example normal analytics server 220 includes the Lumira Server with velocity engine provided as part of the SAP Lumira analytics platform. Although the example of FIG. 2 includes the normal analytics server 220, it is contemplated that the analytics platform 202 can be absent a normal analytics server. In the depicted example, the normal analytics server 220 includes one or more plug-ins that enable handling of online documents and one or more plug-ins that enable handling of offline documents using the ODP engine 224.

In the example of FIG. 2, the analytics platform 202 includes a slim analytics server 230. The slim analytics server 230 is absent an offline document processing engine (e.g., velocity engine) and executes in a process 232. In this example, the slim analytics server 230 is operating in the online mode (i.e., only processes requests associated with online documents). The slim analytics server 230 includes one or more plug-ins 234 that enables the slim analytics server 230 to perform analytics processing using online documents (e.g., the same online plug-ins as the normal analytics server 220).

The slim analytics server 230 receives requests from the web tier 206 and processes the requests for analytics. In some examples, analytics processing includes querying one or more online data sources, each online data source processing queries on data stored in one or more online documents and providing query results back to the slim analytics server 230. The slim analytics server 230 provides a response to the web tier 206, the response including at least a portion of the query results. In some examples, the response includes a server identifier (ID) that uniquely identifies the slim analytics server 230. In this manner, a subsequent request associated with the online data sources of the previous request can be transmitted specifically to the slim analytics server 230. This enables a session with a client (e.g., the client device 204) to be maintained (which can be referred to as stickiness). This can be used in cluster scenarios, in which multiple slim analytics servers 230 are provided within the analytics platform 202.

In the example of FIG. 2, the analytics platform 202 includes a slim analytics server 240. The slim analytics server 240 is absent an offline document processing engine (e.g., velocity engine) and executes in a process 242. In this example, the slim analytics server 242 is operating in the offline mode (i.e., only processes requests associated with offline documents). Accordingly, the analytics platform 202 further includes an offline document server 244 that executes in a process 246. The process 242 and the process 246 are separate and distinct from one another. The slim analytics server 240 communicates with the offline document server 244 for handling of offline documents.

In further detail, the slim analytics server 240 includes a proxy 250 that enables communication with the offline document server 244. The slim analytics server 240 seeks to retrieve the offline document service running on the offline document server 244 from the Java SDK (e.g., IVelocityService velocityService=(IVelocityService) session.getService(" ", "VelocityService")). The framework has to locate and load the factory class for the client object (velocityService). The location of the factory class is stored in the properties file. The framework created factory class (velocityFactory) and uses this factory to create the client object (velocityService). The client object loads the client side stubs and the client-side stubs are wrapped in proxy class.

Example interfaces are provided as:

```
public interface IVelocityServiceProxy {
    /**
     * @param session
     * @param request
     * @return IVelocityServiceImpl
     * @throws SDKException
     */
    IVelocityServiceImpl
getServiceImpl(IEnterpriseSession session) throws
SDKException;
}
public interface IVelocityServiceImpl {
    /**
     * @param request
     * @return response from Velocity Service
     * @throws Exception
     */
    VelocityResponse
executeVelocityRequest(VelocityRequest request) throws
Exception;
}
/**
 * A registered factory for the VelocityService client.
 * Used to instantiate the service after a service request on
the enterprise session.
 *
 * @see IEnterpriseSession
 * @see VelocityService_Client
 */
public class VelocityService_ClientFactory implements
IOCCAFactory {
    private static IOCCAFactory singleton = new
VelocityService_ClientFactory( );
    /**
     * @return Object
     */
    public static Object getFactory( ) {
        return singleton;
    }
    @Override
    public Object makeOCCA(final String svr, final
ISecuritySession session) throws SDKException {
        return new
VelocityService_Client(svr, session);
    }
}
final class VelocityService_Client implements
IVelocityServiceImpl {
    @Override
    public VelocityResponse
executeVelocityRequest(final VelocityRequest request) throws
Exception {
    }
}
public class VelocityServiceProxy implements
IVelocityServiceProxy {
    @Override
    public IVelocityService_Client
getServiceImpl(final IEnterpriseSession session, final
VelocityRequest request)
    throws SDKException {
        return (IVelocityService_Client)
session.getService("", "VelocityService");
    }
}
```

The slim analytics server 250 also includes plug-ins that enable the slim analytics server 250 to perform analytics processing. In the example of FIG. 2, the plug-ins include server online plug-ins and server offline plug-ins. In some examples, the server online plug-ins are used to connect and execute queries at the database for online documents. In some examples, the offline plug-ins are used to load velocity engine and create required schemas and executed calculations.

In the depicted example, the offline document server 244 includes a provider 256 and a calculation engine 258. In some examples, the provider 256 enables communication with the slim analytics server 250. In some examples, the calculation engine 258 loads data from online document(s) (e.g., from a document store 266 that offline documents are uploaded to) that are the subject of a received request and processes the data for analytics.

In operation, the slim analytics server 250 receives requests from the web tier 206 and processes the requests for analytics. In some examples, analytics processing includes the slim analytics server 250 transmitting a request to the offline document server 244, which uploads data from the offline documents to one or more tables. The offline document server 244 (e.g., the calculation engine 258) queries the data to generate query results. The query results are provided in a response to the slim analytics server 250. The slim analytics server 250 provides a response to the web tier 206, the response including at least a portion of the query results. In some examples, the response includes a server ID that uniquely identifies the slim analytics server 250. In this manner, a subsequent request associated with the offline data sources of the previous request can be transmitted specifically to the slim analytics server 250. This enables a session with a client (e.g., the client device 204) to be maintained (which can be referred to as stickiness). This can be used in cluster scenarios, in which multiple slim analytics servers 250 are provided within the analytics platform 202.

In some examples, the data objects repository 260 (e.g., BOE Repository) stores metadata in the form of info objects. In some examples, the system database 262 can include flat files, in which data is stored. In some examples, the file repository 264 stores documents and is managed by the file repository server. In some examples, the ODP database 266 (e.g., velocity database) is provided as a lite database (e.g., HANA lite database) that is used only for offline documents. When the document is opened, the metadata is fetched from the document and the data for the offline documents is fetched from the system database 262. It is then temporarily stored in the ODP database 266 in the form of a table. All of the calculation are performed here. The data will be fetched from this table using queries (e.g., SQL queries). When the document is closed, the data from this will be either persisted in the document (save with data) or else will be removed from the database.

Figure 3:
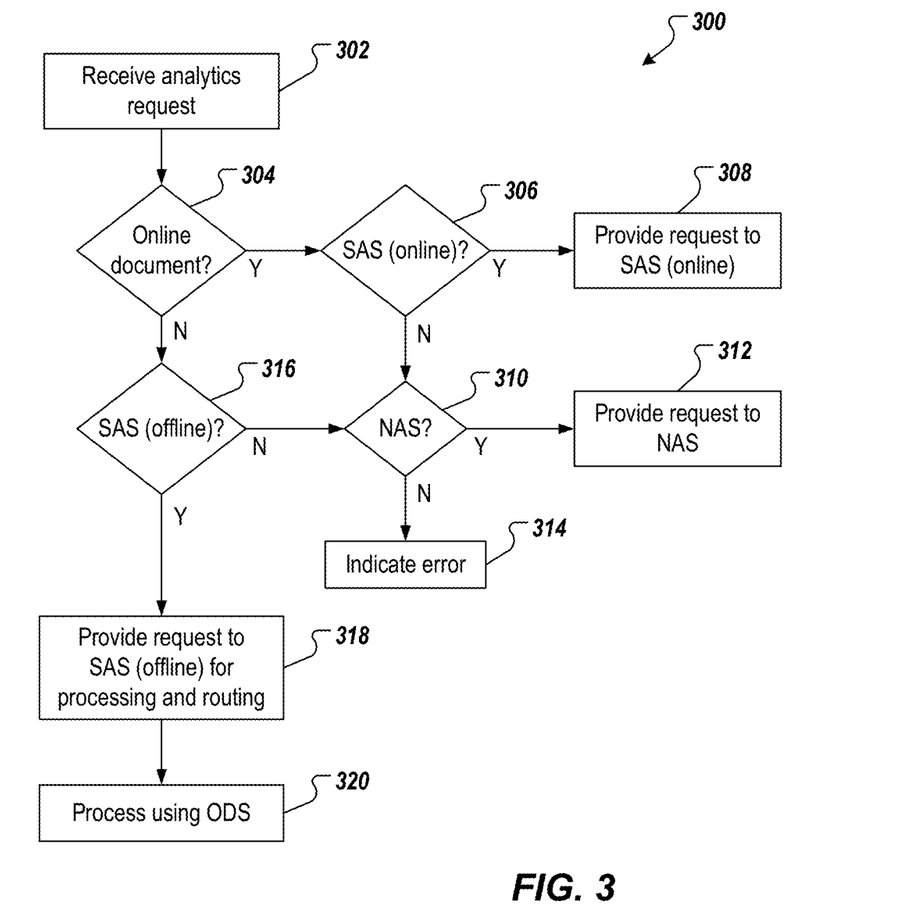
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

An analytics request is received (302). For example, and with reference to FIG. 2, the web tier 206 receives an analytics request from the client device 204. It is determined whether the analytics request implicates an online document (304). For example, the web tier 206 determines that the analytics request identifies one or more online documents that are to be processed to provide analytics results. If the analytics request implicates an online document, it is determined whether a slim analytics server (SAS) operating in the online mode is available (306). For example, the web tier 206 can poll the analytics platform 202 for available analytics servers. It can be determined whether the available analytics servers include at least one slim analytics server operating in the online mode.

If a slim analytics server operating in the online mode is available, the analytics request is routed to the slim analytics server for processing (308). For example, and as described herein, the slim analytics server 230 receives the analytics request from the web tier 206 and processes the analytics request. In some examples, analytics processing includes querying one or more online data sources, each online data source processing queries on data stored in one or more online documents and providing query results back to the slim analytics server 230. The slim analytics server 230 provides a response to the web tier 206, the response including at least a portion of the query results as analytics results. In some examples, the response includes a server ID that uniquely identifies the slim analytics server 230.

If a slim analytics server operating in the online mode is not available, it is determined whether a normal analytics server (NAS) is available (310). For example, it can be determined whether the available analytics servers include at least one normal analytics server. If a normal analytics server is available, the analytics request is routed to the normal analytics server for processing (312). For example, and as described herein, the normal analytics server 220 receives the analytics request from the web tier 206 and processes the analytics request. In some examples, analytics processing includes querying one or more online data sources, each online data source processing queries on data stored in one or more online documents and providing query results back to the normal analytics server 220. The normal analytics server 220 provides a response to the web tier 206, the response including at least a portion of the query results as analytics results. In some examples, the response includes a server ID that uniquely identifies the normal analytics server 220.

If a normal analytics server is not available, an error is indicated (314). For example, the web tier 206 can provide a response to the client device 204, the response indicating that the analytics request cannot be processed. In some examples, the response can provide a reason (e.g., that the analytics request implicates an online document and there are no analytics servers available to handle the online document).

If the analytics request implicates an online document, it is determined whether a slim analytics server (SAS) operating in the offline mode is available (316). For example, the web tier 206 can determine whether the available analytics servers include at least one slim analytics server operating in the offline mode. If a slim analytics server operating in the offline mode is available, the analytics request is routed to the slim analytics server for processing (314). For example, and as described herein, the slim analytics server 250 receives the analytics request from the web tier 206 and processes the analytics request. In some examples, analytics processing includes the slim analytics server 250 transmitting a request to the offline document server 244, which uploads data from the offline documents to one or more tables. The offline document server 244 (e.g., the calculation engine 258) queries the data to generate query results. The query results are provided in a response to the slim analytics server 250. The slim analytics server 250 provides a response to the web tier 206, the response including at least a portion of the query results. In some examples, the response includes a server ID that uniquely identifies the slim analytics server 250.

If a slim analytics server operating in the offline mode is not available, it is determined whether a normal analytics server (NAS) is available (310), and the example process 300 continues as described above.

Figure 4:
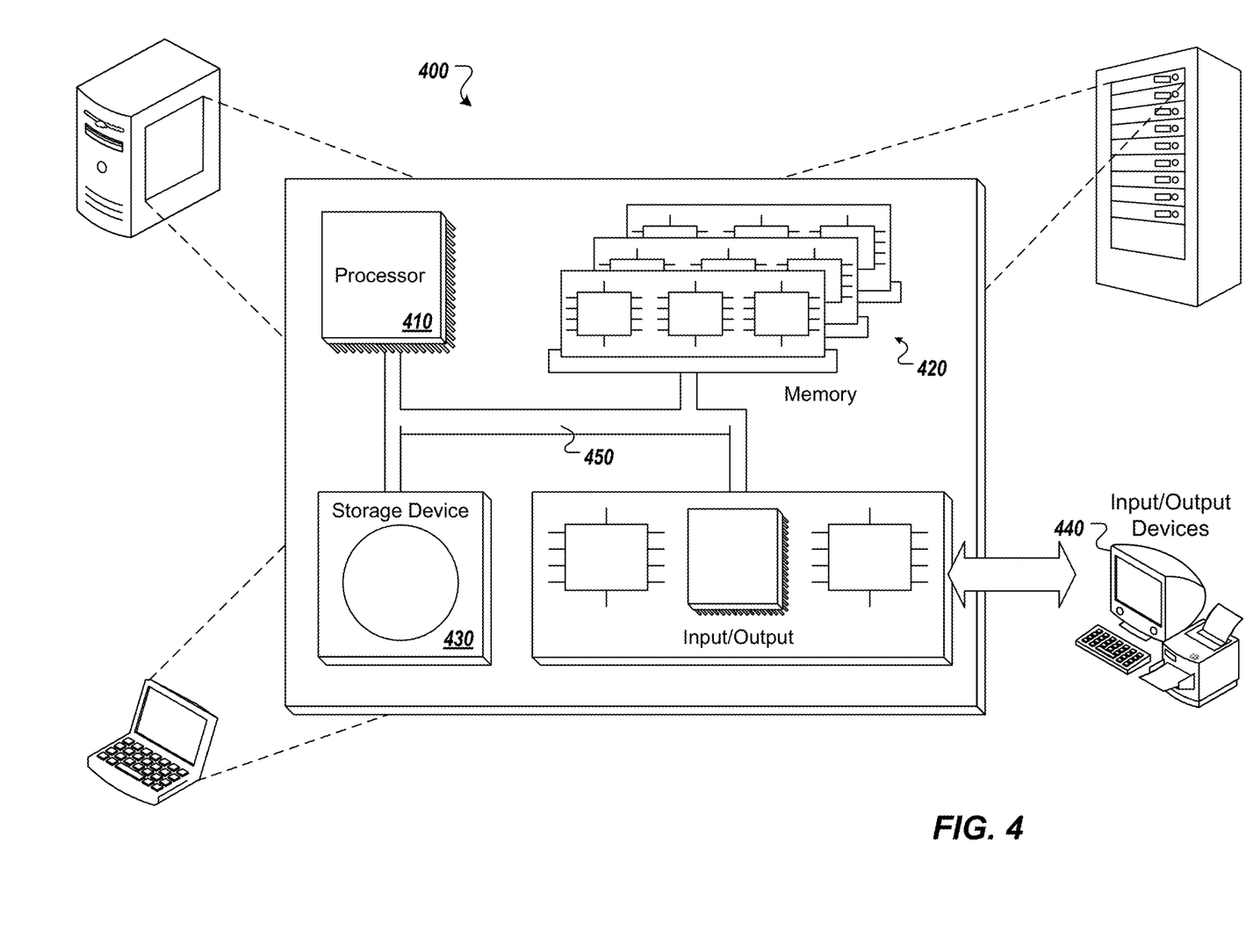
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing analytic results from an analytics platform, the method being executed by one or more processors and comprising:
   receiving, by a web tier, a first analytics request from a client device;
   determining, by the web tier, that the first analytics request implicates at least one offline document;
   transmitting, by the web tier, at least a portion of the first analytics request to a first slim analytics server of an analytics platform, the first slim analytics server operating in an offline mode and, in response to receiving the at least a portion of the first analytics request, the first slim analytics server communicates with an offline document server that loads data from the at least one offline document and executes one or more computations on the data to provide first analytics results to the first slim analytics server;
   receiving, by the web tier, the first analytics results from the first slim analytics server;
   transmitting, by the web tier, a response to the client device, the response comprising the first analytics results;
   determining, by the web tier, that a second analytics request implicates at least one online document;
   transmitting, by the web tier, at least a portion of the second analytics request to a second slim analytics server of the analytics platform, the second slim analytics server operating in an online mode and, in response to receiving the at least a portion of the second analytics request, the second slim analytics server communicates with at least one online data sources that executes one or more computations on data of the at least one online document to provide second analytics results to the second slim analytics server; and
   receiving, by the web tier, the second analytics results from the first slim analytics server.

2. The method of claim 1, wherein the first slim analytics server is absent functionality for processing offline documents to generate analytics results.

3. The method of claim 1, wherein the first slim analytics server executes within a first process and the offline document server executes in a second process that is different from the first process.

4. The method of claim 1, the first slim analytics server comprises a proxy for communication with the offline document server.

5. The method of claim 1, wherein the analytics platform comprises a normal analytics server and an offline document processing engine that execute in a process.

6. The method of claim 1, wherein the response comprises a server identifier that uniquely identifies the first slim analytics server within the analytics platform.

7. A non-transitory computer-readable storage medium coupled to one or more processors and having instructions stored thereon which, when executed by the one or more processors, cause the one or more processors to perform operations for providing analytic results from an analytics platform, the operations comprising:
   receiving, by a web tier, a first analytics request from a client device;
   determining, by the web tier, that the first analytics request implicates at least one offline document;
   transmitting, by the web tier, at least a portion of the first analytics request to a first slim analytics server of an analytics platform, the first slim analytics server operating in an offline mode and, in response to receiving the at least a portion of the first analytics request, the first slim analytics server communicates with an offline document server that loads data from the at least one offline document and executes one or more computations on the data to provide first analytics results to the first slim analytics server;
   receiving, by the web tier, the first analytics results from the first slim analytics server;
   transmitting, by the web tier, a response to the client device, the response comprising the first analytics results;
   determining, by the web tier, that a second analytics request implicates at least one online document;
   transmitting, by the web tier, at least a portion of the second analytics request to a second slim analytics server of the analytics platform, the second slim analytics server operating in an online mode and, in response to receiving the at least a portion of the second analytics request, the second slim analytics server communicates with at least one online data sources that executes one or more computations on data of the at least one online document to provide second analytics results to the second slim analytics server; and receiving, by the web tier, the second analytics results from the first slim analytics server.

8. The computer-readable storage medium of claim 7, wherein the first slim analytics server is absent functionality for processing offline documents to generate analytics results.

9. The computer-readable storage medium of claim 7, wherein the first slim analytics server executes within a first process and the offline document server executes in a second process that is different from the first process.

10. The computer-readable storage medium of claim 7, the first slim analytics server comprises a proxy for communication with the offline document server.

11. The computer-readable storage medium of claim 7, wherein the analytics platform comprises a normal analytics server and an offline document processing engine that execute in a process.

12. The computer-readable storage medium of claim 7, wherein the response comprises a server identifier that uniquely identifies the first slim analytics server within the analytics platform.

13. A system, comprising:
a computing device; and
a computer-readable storage device coupled to the computing device and having instructions stored thereon which, when executed by the computing device, cause the computing device to perform operations for providing analytic results from an analytics platform, the operations comprising:
receiving, by a web tier, a first analytics request from a client device;
determining, by the web tier, that the first analytics request implicates at least one offline document;
transmitting, by the web tier, at least a portion of the first analytics request to a first slim analytics server of an analytics platform, the first slim analytics server operating in an offline mode and, in response to receiving the at least a portion of the first analytics request, the first slim analytics server communicates with an offline document server that loads data from the at least one offline document and executes one or more computations on the data to provide first analytics results to the first slim analytics server;
receiving, by the web tier, the first analytics results from the first slim analytics server;
transmitting, by the web tier, a response to the client device, the response comprising the first analytics results;
determining, by the web tier, that a second analytics request implicates at least one online document;
transmitting, by the web tier, at least a portion of the second analytics request to a second slim analytics server of the analytics platform, the second slim analytics server operating in an online mode and, in response to receiving the at least a portion of the second analytics request, the second slim analytics server communicates with at least one online data sources that executes one or more computations on data of the at least one online document to provide second analytics results to the second slim analytics server; and
receiving, by the web tier, the second analytics results from the first slim analytics server.

14. The system of claim 13, wherein the first slim analytics server is absent functionality for processing offline documents to generate analytics results.

15. The system of claim 13, wherein the first slim analytics server executes within a first process and the offline document server executes in a second process that is different from the first process.

16. The system of claim 13, the first slim analytics server comprises a proxy for communication with the offline document server.

17. The system of claim 13, wherein the analytics platform comprises a normal analytics server and an offline document processing engine that execute in a process.

* * * * *